United States Patent [19]
Boulanger et al.

[11] Patent Number: 5,560,876
[45] Date of Patent: Oct. 1, 1996

[54] PROCESS FOR PRODUCING AGGLOMERATES FROM DUSTS

[75] Inventors: Claude Boulanger, Shipshaw; Andrew N. Carruthers, Beaconsfield; Robert L. Clegg, Chicoutimi-Nord, all of Canada; Kwat I. The, Gladstone, Australia

[73] Assignee: Alcan International Limited, Montreal, Canada

[21] Appl. No.: 430,896

[22] Filed: May 4, 1995

Related U.S. Application Data

[63] Continuation of Ser. No. 175,782, Dec. 30, 1993, abandoned, which is a continuation-in-part of Ser. No. 972,506, Nov. 6, 1992, Pat. No. 5,296,177, which is a continuation-in-part of Ser. No. 701,108, May 16, 1991, abandoned, which is a continuation-in-part of Ser. No. 697,236, May 6, 1991, abandoned.

[51] Int. Cl.$^6$ .................................................. B29B 9/08
[52] U.S. Cl. ................... 264/40.1; 23/313 R; 264/117; 423/625; 423/629; 501/127
[58] Field of Search ...................... 264/117, 109, 264/40.1; 23/313 R, 313 P; 423/625, 629; 501/127

[56] References Cited

U.S. PATENT DOCUMENTS

| | | |
|---|---|---|
| 2,635,950 | 4/1953 | Robinson . |
| 2,881,051 | 4/1959 | Pingard . |
| 3,222,129 | 12/1965 | Osment et al. . |
| 3,226,191 | 12/1965 | Osment et al. . |

(List continued on next page.)

FOREIGN PATENT DOCUMENTS

| | | |
|---|---|---|
| 48-071779 | 9/1973 | Japan . |
| 63-083171 | 4/1988 | Japan . |
| 8900946 | 11/1990 | Netherlands . |
| 9219535 | 11/1992 | WIPO . |

OTHER PUBLICATIONS

The Drails Turbulent Mixing System—Booklet—Draiswerke GmbH Editioin E.8603/T-System.

*Primary Examiner*—Mary Lynn Theisen
*Attorney, Agent, or Firm*—Cooper & Dunham LLP

[57] ABSTRACT

A process for producing strong, essentially dust-free agglomerates from dust created by an industrial operation carried out, for example, on an ore or mineral, e.g. during the thermal conversion of a material containing predominantly gibbsite to sub-alpha alumina by a multistage thermal process having at least one intermediate stage. The process comprises grinding particles of binder material containing undercalcined alumina to a median particle size of less than 30 microns and to a specific surface area in the range of 90–300 $m^2/g$; combining about 1–4 parts by weight of the dust with one part by weight of the ground binder material to form combined solids; mixing the combined solids with water to produce agglomerates, the total amount of added water being about 0.8–1.2 parts by weight for every part by weight of the ground binder material, plus about 0.08 to 0.12 parts by weight for every part by weight of the dust; and optionally aging the resulting agglomerates in a closed environment at a temperature of at least 80° C. for at least one hour in at least 50% humidity. The water is mixed with the combined solids by intensive mixing in a mixer equipped with a mixing motor, the water being added according to the following scheme: (a) 40–80% of the total amount of water is added to the combined solids at a rate such that no more than 10 minutes are required for complete addition; (b) optionally allowing a period of time to pass after the addition of the water in step (a) before proceeding further while continuing the intensive mixing; (c) commencing the addition of the remainder of the water and measuring a characteristic of said mixture corresponding to its viscosity and using the measurement as a reference value; and (d) continuing the addition of the remainder of the water while continuing to measure the characteristic of the mixture, the water being added at such a rate that the characteristic of the mixture remains the same as the reference value during the addition or varies by less than ±5%.

24 Claims, 1 Drawing Sheet

U.S. PATENT DOCUMENTS

| | | |
|---|---|---|
| 3,228,891 | 1/1966 | Duke . |
| 3,392,125 | 7/1968 | Kelly . |
| 3,701,718 | 10/1972 | Papee et al. . |
| 3,714,313 | 1/1973 | Beiding et al. ............ 264/117 |
| 4,027,859 | 6/1977 | Stone . |
| 4,075,067 | 2/1978 | Bhilotra . |
| 4,124,699 | 11/1978 | Michel et al. ............ 423/628 |
| 4,159,313 | 6/1979 | Mercier et al. ............ 423/625 |
| 4,159,969 | 7/1979 | Moné et al. . |
| 4,169,874 | 10/1979 | Bambrick ............ 264/44 |
| 4,343,751 | 8/1982 | Kumar ............ 264/37 |
| 4,397,561 | 8/1983 | Strong et al. . |
| 4,579,839 | 4/1986 | Pearson ............ 423/628 |
| 4,658,899 | 4/1987 | Fitzgibbon ............ 501/127 |
| 4,704,378 | 11/1987 | Fleming et al. ............ 423/625 |
| 4,713,203 | 12/1987 | Andrews ............ 264/117 |
| 4,797,271 | 1/1989 | Fleming et al. ............ 423/625 |
| 5,244,648 | 9/1993 | Dupin et al. ............ 423/626 |

PROCESS FOR PRODUCING AGGLOMERATES FROM DUSTS

CROSS REFERENCE TO RELATED APPLICATION

This application is a continuation of application Ser. No. 175,782, filed Dec. 30, 1993, abandoned which is a continuation-in-part of U.S. patent application Ser. No. 07/972,506, filed Nov. 6, 1992, now U.S. Pat. No. 5,296,177, which is itself a continuation-in-part of application Ser. No. 07/701,108, filed May 16, 1991, now abandoned, which is itself a continuation-in-part of application Ser. No. 07/697,236 filed May 6, 1991, also now abandoned.

BACKGROUND OF THE INVENTION

I. FIELD OF THE INVENTION

This invention relates to the preparation of strong agglomerates from airborne dusts especially, but not exclusively, alumina-containing dusts such as electrostatic precipitator (ESP) dust derived from a process of converting a material containing predominantly gibbsite to sub-alpha alumina or corundum (alpha alumina), and to the agglomerates thus produced.

II. DISCUSSION OF THE PRIOR ART

Material containing predominantly gibbsite (alumina trihydrate, $Al_2O_3 \cdot 3H_2O$) is produced by the Bayer process and is subsequently thermally converted into sub-alpha alumina (or corundum) of low water content, typically less than 3%, by a multi-stage heating process. Airborne dust is produced during this process and is usually collected by means of electrostatic precipitators in order to avoid environmental pollution. The suspended or airborne dust collected in this way is a very fine undercalcined alumina having a particle size which may vary according to the shape or density of the particles and according to the gas or air velocity. Typically, more than 60% of the dust is in the form of particles less than 20 microns in size and the particles generally have a median size of 3–5 microns. The dust usually consists of a mixture of particles of fully calcined (anhydrous) alumina, partially calcined alumina and uncalcined (trihydrate) alumina which collectively exhibit a loss of mass (LOM) on heating from ambient to 1100° C. (sometimes referred to as loss on ignition or LOI) of between 1 and 35% by weight.

Attempts have been made to utilize such dust by adding it to the bauxite feed of the Bayer digestion process or by recycling the dust to other process feeds or product lines. However, this is not very satisfactory because the dust is difficult to handle and may not contain the proper ingredients for the processes or products involved. For example, ESP dust generally contains 5–80% of a form of alumina which does not undergo caustic digestion when used in the Bayer process and thus ends up in the "red mud" waste product of the process, which itself presents disposal problems. As a result, ESP dust is often just slurried and pumped to a disposal site.

Dusts of this kind, and dusts produced by other industrial processes, e.g. dusts produced by the treatment of various other minerals and ores, would be much easier to handle if they could be agglomerated into particles of larger size since they would then have reduced tendencies to become airborne. This could be achieved by the use of suitable binders (e.g. various polymers, etc.) followed by pelletization or the like, but polymeric binders tend to be expensive and remain in the product as contaminants, making the agglomerated product unsuitable for recycling to various processes, and would be eliminated at the high temperatures used in various treatment processes, leading to easy fracture of the particles and regeneration of the original dust.

Several processes are already known for the agglomeration of particles of alumina but these involve complex and expensive steps and generally do not relate to the treatment of dusts, i.e. particles of such a small size that the particles easily become airborne.

For example, U.S. Pat. No. 4,169,874 to Bambrick teaches that shaped alumina particles can be produced by preparing an aqueous slurry of an alumina composition containing a substantial portion of rehydratable alumina, and then subjecting the slurry to shaping, rehydrating and curing. The shaped bodies are formed by first making a slurry having a solids content from 50–60% and passing it through an immiscible phase at a temperature from 80°–100° C.

Furthermore, U.S. Pat. No. 4,579,839 to Pearson discloses a process in which flash activated alumina is used to bond ceramic bodies together. Agglomeration and shaping is then carried out in a hot liquid which is immiscible in water.

However, as stated above, such processes are not well suited to the treatment of dusts and tend to be too expensive for application to waste materials.

OBJECTS OF THE INVENTION

It is therefore an object of the invention to provide a process for producing strong agglomerates from dusts produced by industrial treatments of minerals and ores in order to facilitate the handling and utilization of such dusts.

Another object of the invention is to provide a process for producing agglomerates from such dusts, which makes possible the return of the dusts to the product lines from which the dusts were originally generated.

Yet another object of the invention is to provide a process for producing strong agglomerates from such dusts, which process can be carried out inexpensively and relatively easily.

A still further object of the invention, at least in its preferred forms, is to enable a procedure for improving the yield of the thermal conversion of hydrated aluminas to alpha or sub-alpha alumina by capturing dust generated by the process and returning it to the product line in a utilizable form.

SUMMARY OF THE INVENTION

The process of the invention can be broadly applied to the dust produced in any thermal treatment or other process, such as grinding, crushing, washing, size classifying, etc., in which the generated dust is mixed with a material containing rehydratable alumina, and then reacted with water in an intensive mixer, in which the rate of water addition is controlled. Specifically, the rate is increased or decreased according to a procedure initially established preferably by monitoring the rate of change of power drawn or power input to the mixer.

More particularly, in one aspect, the present invention provides a process for producing agglomerates from dust created by an industrial process, comprising: grinding particles of a binder containing undercalcined alumina to a median particle size of less than 30 microns and to a specific surface area in the range of 90–300 $m^2/g$; combining about 1–4 parts by weight of said dust with one part by weight of said ground binder to form combined solids; mixing the combined solids with water to produce agglomerates, the total amount of added water being about 0.8–1.2 parts by weight for every part by weight of said ground binder, plus about 0.08 to 0.12 parts by weight for every part by weight of said dust; and optionally aging the resulting agglomerates in a closed environment at a temperature of at least 80° C. for at least one hour in at least 50% humidity; wherein the water is mixed with said combined solids by intensive mixing in a mixer equipped with a mixing motor; and wherein said water is added to said combined solids according to the following scheme: (a) 40–80% of said total amount of water is added to said combined solids at a rate such that no more than 10 minutes are required for complete addition, forming a mixture having a viscosity; (b) optionally allowing a period of time to pass after the addition of the water in step (a) before proceeding further while continuing said intensive mixing; (c) commencing an addition of a remainder of said water and measuring a characteristic of said mixture corresponding to said viscosity and using the measurement as a reference value; and (d) continuing the addition of said remainder of said water while continuing to measure the said characteristic of the mixture, said water being added at such a rate that said characteristic of the mixture remains the same as said reference during the addition or varies by less than ±5% of said reference value.

In another aspect, the invention provides a process for producing agglomerates from dust created during an industrial process by a series of batchwise operations, comprising carrying out the above process on a first batch and measuring the rate of water addition in step (d), then producing agglomerates in further batches by carrying out the same steps except for assessing said viscosity in step (c) but maintaining all conditions the same as in the first batch, including the rate of water addition in step (d).

The invention also relates to a process for producing agglomerates from dust collected during the thermal conversion of a material containing predominantly gibbsite to sub-alpha alumina by a multistage thermal process having at least one intermediate stage, which process comprises: removing undercalcined alumina from an intermediate stage of said thermal conversion; grinding particles of said undercalcined alumina to a median particle size of less than 30 microns and to a specific surface area in the range of 90–300 m²/g; combining about 1–4 parts by weight of the dust with one part by weight of said ground undercalcined alumina to form combined solids, the total amount of added water being about 0.8–1.2 parts by weight for every part by weight of said ground undercalcined alumina plus about 0.08 to 0.12 parts by weight for every part by weight of said dust; mixing the combined solids with water to produce agglomerates; and optionally aging the resulting agglomerates in a closed environment at a temperature of at least 80° C. for at least one hour in at least 50% humidity; wherein the water is mixed with said combined solids by intensive mixing; and wherein the water is added according to the following scheme: (a) 40–80% of the total amount of the water is added at a rate such that it requires up to 10 minutes to complete the addition; (b) optionally a period of time is then allowed to pass after the addition of water in step (a) before proceeding further, while intensive mixing continues; (c) after 5 to 16 minutes from the beginning of the water addition in step (a), the remainder of the water is added at a rate not greater than 0.07 parts per minute; and (d) optionally the rate of addition in step (c) is decreased so that the addition of the remainder of the water ends at about 20 to 50 minutes, more preferably 20 to 30 minutes, from the beginning of the water addition in step (a).

The invention also relates to agglomerates produced by the process.

By the term "undercalcined alumina" we mean a form of alumina which has been partially, but not fully, converted from alumina trihydrate or alumina monohydrate to sub-alpha alumina or alpha alumina and which has the ability to react with water to revert back to more hydrated forms. The invention makes use of materials containing undercalcined alumina as binders for the dust. Such materials may contain other ingredients, e.g. silica, iron oxide, titania, etc. For example, such additional materials are present when a binder is based on heat-treated bauxite being prepared as an abrasive or refractory grade bauxite. Certain clays may also be suitable as binders and contain concentrations of alumina together with silica, etc.

The process of the present invention makes it possible to consistently produce batches of satisfactory, small, strong, dust-free (i.e. less than 5% dust) particles.

DETAILED DESCRIPTION OF THE PREFERRED EMBODIMENTS

Figure 1:
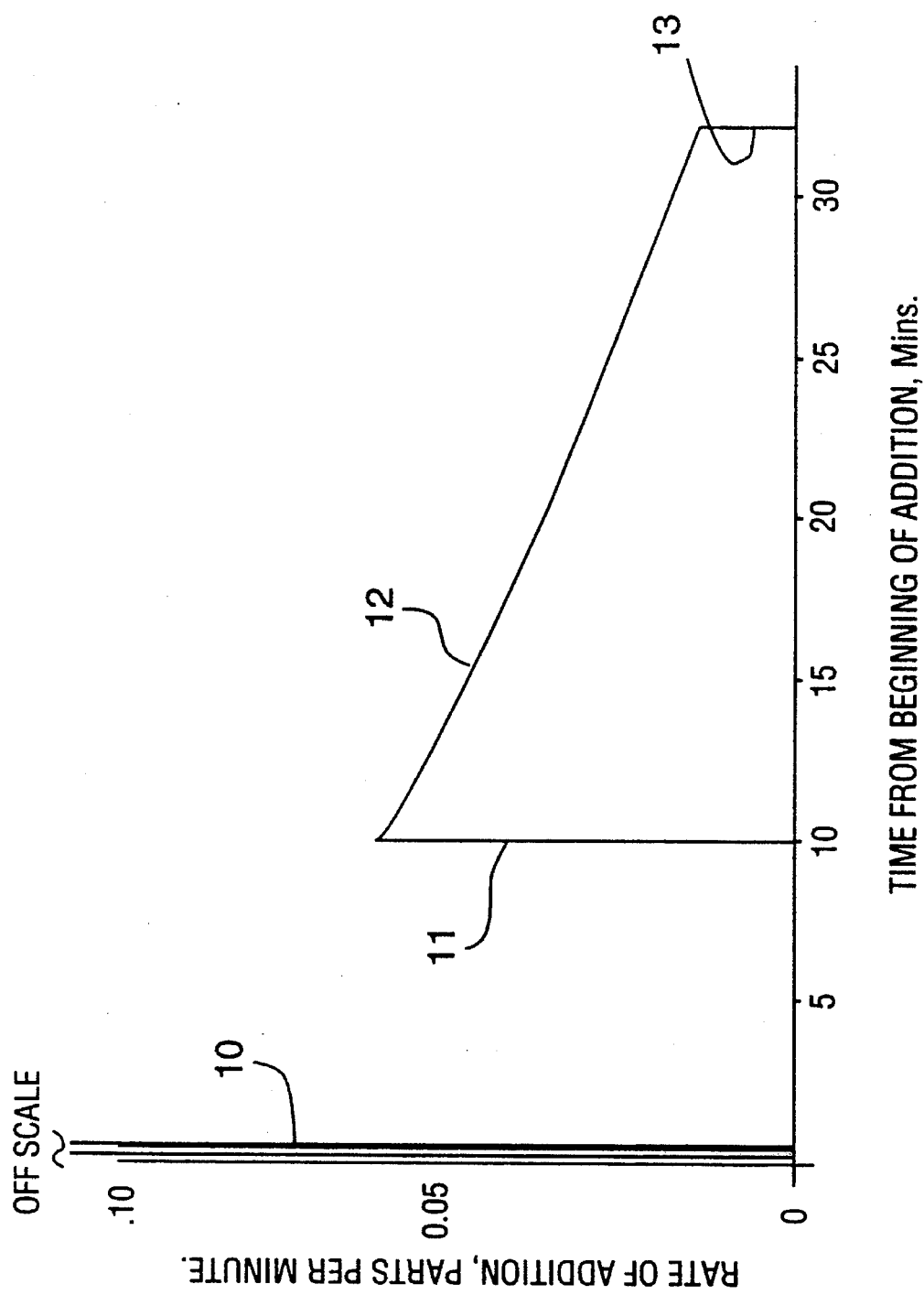
FIG. 1 is a graph showing a typical rate of addition of water during a procedure according to a preferred embodiment of the present invention.

The present invention relies on the use of water and a binder containing undercalcined alumina to bind together dust particles into strong agglomerates. However, it has been found according to the present invention that the water has to be added to the mixture of dust and binder according to a special procedure, described in more detail below, in order to produce suitable agglomerates in an economical manner.

The following description relates mainly to the use, as a binder for the dust, of undercalcined alumina taken from an intermediate stage in a process for the thermal conversion of gibbsite to sub-alpha or alpha alumina. Moreover, the dust to which the process is normally applied is dust produced during the same thermal conversion process. However, it should be kept in mind that the process of the invention can make use of other binders of the stated type and can be applied to the agglomeration of dusts from other industrial operations.

The above-mentioned embodiment of the invention can be operated very inexpensively because the undercalcined alumina used as a binder for the alumina dust can be removed from an intermediate stage of the same thermal process that produces the dust, and the agglomerates may be returned to the beginning of the process or to an intermediate stage or final product stream of the same thermal process. The materials are all thus readily available, the product is disposed of conveniently and there is no harm to the product of the thermal conversion because the dust agglomerates do not contain any foreign materials or adulterants not already found in the product. In fact, the agglomerated dust generally has identical properties to the final product of the thermal conversion and thus can be used in identical ways to that product.

In most processes used for the thermal conversion of gibbsite, e.g. process involving fluidized beds, suspended particles or the use of cyclones, the equipment has several physically separated zones confined within different reactors. In other processes, e.g. those using rotary kilns, the heating is carried out in a single reactor, but there are different treatment zones within the reactor characterized by regions of different temperature within the material mass. In the preferred aspect of the present invention, the intermediate stage from which the undercalcined material is taken may be one of the physically separate zones of the multi-reactor equipment, or one of the intermediate temperature regions of the single reactor equipment. In general, any intermediate thermally treated material that contains undercalcined alumina is suitable for use as a binder in the invention. Thus, by the term "intermediate stage" of the thermal conversion we mean a stage within which the original hydrated alumina has not yet been fully converted to the final sub-alpha or alpha alumina.

The agglomerates resulting from the use of such binders are strong, even though they are not necessarily sintered, and do not disintegrate significantly upon manipulation in mechanical conveying systems. In fact the agglomerates normally closely resemble or are indistinguishable from smelter grade sandy alumina, both chemically and physically, once calcined.

The dust itself may be collected in any suitable way, but is most usually collected in electrostatic precipitators and is then referred to in the following as electrostatic precipitator (ESP) dust. It should be kept in mind, however, that airborne dust collected in other ways may be used in the invention.

When the dust and material containing undercalcined alumina are both obtained from the thermal conversion of gibbsite to sub-alpha alumina, the undercalcined material differs from the dust itself merely in the extent of its conversion to sub-alpha alumina (the dust generally does not rehydrate readily) and in the relative particle sizes (the dust is of course much finer). The undercalcined material used as the binder may vary in particle size, but is often in the 55–120 micron median size range, and more often in the 95–100 micron median size range. Suitable material containing undercalcined alumina can be obtainable, for example, from the secondary cyclone of a fluid flash alumina calciner, but it may be obtained from other sources such as flash activated alumina, products or dust from bauxite calciners, etc.

The undercalcined material used as the binder is first ground to a smaller size range, e.g. less than 30 microns median size, before being mixed with the dust. This exposes fresh surfaces of the undercalcined material, which are more reactive, and reduces the average particle size so that better packing with the dust can be achieved. The grinding step generally increases the surface area of the material to the range of 90 to 300 $m^2/g$ and may be carried out in any suitable grinding apparatus, for example a ball mill, a rod mill or a jet mill.

The ESP dust is then mixed with the ground undercalcined alumina to form a solids mixture, the ratio of admixture of the dust to the ground undercalcined material being about 1–4:1 parts by weight, respectively. The LOM of the resulting solids mixture is generally between 1–35% (preferably 1–25%). If the LOM is less than 1%, the mixture contains insufficient ground undercalcined alumina to produce suitable agglomerates.

The solids mixture produced in the indicated manner is then mixed with water (or the solids and water may be mixed essentially simultaneously, but this is very difficult to carry out effectively) so that the required agglomerates can be formed. The amount of water required to produce suitable agglomerates depends to some extent on the size of the agglomerates desired and the nature of the ESP dust and ground undercalcined alumina, but is optimally about 0.8–1.2 parts by weight of water for every part by weight of the ground undercalcined alumina, plus about 0.08–0.12 parts by weight for every part by weight of the dust. Most preferably, about 1 part by weight of water is provided for each part by weight of ground undercalcined alumina plus about 0.1 part by weight of water for each part by weight of dust. Thus, for a mixture consisting of 4 parts by weight of ESP dust and 1 part by weight of ground undercalcined alumina, the optimal amount of water would be about 1.4 parts by weight. A larger amount of water tends to result in the formation of large clumps and can reduce the strength of any agglomerates that are formed, or it results in the formation of a slurry of the dust. A smaller amount of water results in little or no bonding together of the dust particles.

As stated above, the way in which the water is added is very important. First of all, the water addition is carried out while the mixture undergoes intensive mixing (sometimes referred to as turbulent rapid mixing). Intensive mixing is a procedure which makes use of all of the directions of movement of the mix in a mixing chamber, with simultaneous rapidly acting energy input. Intensive mixing makes it possible to control the size of the agglomerates precisely and is advantageous because it creates a forceful impact of the solids mixture with the water, thereby creating small agglomerates. Highly desirable generally spherical agglomerates having a size in the range 0.05 to 2 mm may be produced in this way. Other agglomeration devices which do not rely on intensive mixing, e.g. pan pelletizers, provide less aggressive mixing, resulting in unacceptably large agglomerates. Having said this, it should be noted that fluidized bed agglomerators may sometimes be used. They produce agglomerates of the appropriate size of between 60 and 100 microns. Unfortunately, the product is often not sufficiently strong to survive the subsequent processing steps.

Any suitable form of intensive mixer/agglomerator may be used for the water addition in the present invention. Such mixers usually take the form of a closed cylinder or an open cylinder or bowl, mounted on one side, optionally inclined from the vertical. A number of plough-shaped elements are made to rotate through the mixture being processed, either by being mounted on a slowly rotating central shaft in a stationary cylinder, or by being fixed to a stationary support or lid while the bowl or cylinder is made to rotate. High speed rotating cutters or choppers protrude into the cylinder or bowl and make contact with the mix as it is lifted by the rotating ploughs or as it is brought into position by the rotating bowl. During this intensive mixing, water is added to the mix, preferably in the form of a fine spray, to cause the rehydration of the undercalcined alumina, which provides a binding action through the formation of hydrate bonds.

Suitable intensive mixers for this process include mixers of the Eirich type (for example, as described in U.S. Pat. No. 3,674,241 issued on Jul. 4, 1972 to Eirich et. al. and U.S. Pat. No. 3,690,622 issued on Sep. 12, 1972 to Brunner et. al., the disclosures of which are incorporated herein by reference). Particular models include Eirich Intensive Mixers, Model ROB (Trademark) of 80 kg dry weight capacity, and Model RT09 (Trademark) having a dry capacity of 4 Kg. Other suitable mixers include the Littleford FM-130D (Z) Batch Mixer (Trademark), made by Littleford Day Inc., 7451 Empire Drive, Florence, Ky., U.S.A.; and Drais Turbulent Rapid Mixer Type T160 (Trademark), made by Draiswerke GmbH, Speckweg 42/59, D-6800 Mannheim 31, Germany.

When an Eirich type mixer is used, it is preferably operated at a pan speed of about 65 rpm and with a rotor peripheral speed of 40 m/sec or more, optimally about 43 m/sec. These speeds are preferred because they suitably influence the size of the agglomerates and the extent of compaction, and thus affect the final strength of the agglomerates.

During the mixing of the solids with the water, the mixer is preferably operated without interruption throughout the entire period from start to finish. Moreover, the rate (speed) of mixing is generally not changed, instead the power required to maintain the mixing is monitored, as will be explained below.

It has been found that, during the mixing process, when the mixture of dust and undercalcined alumina gets too wet, the quality of the resulting agglomerates suffers. On the other hand, if the mixture gets too dry, the batch takes longer to prepare and manufacturing costs significantly increase, which is a particular disadvantage for the treatment of what is essentially a waste material. It has been found that the desired results are obtained if the water can be added at a rate equal to, or slightly less than, the rate at which the water can be absorbed by and reacted with the undercalcined alumina in the mixture. Unfortunately, this is difficult to achieve because there is no known instrument capable of directly measuring the water absorption/reaction rate of the mixture. Instead, it has been found that a specific procedure for the water addition leads to optimal results.

It has been discovered that the optimal rates of addition of water can be derived by monitoring the rate of change of power drawn preferably by the ploughs of an intensive mixer as an indication of the progress of the rehydration process. In effect, this is a measure of the viscosity of the mixture which, in turn, is indicative of the free surface moisture of the mixture. The rate of change of total power drawn by both the plough drive and the high speed cutters may be monitored instead, but it is not as sensitive a measure as the rate of change of power drawn of the plough drive alone.

As a first step in the water addition procedure, 40–80% by volume of the calculated total amount of water is added at a rate such that it requires no more than about 10 minutes for completion. Preferably, the water addition in this step is carried out in "one shot", i.e. as quickly as reasonably possible. As a practical matter, the addition of the water usually takes about 10 seconds depending on the diameter of the delivery pipe or nozzle. While longer times are possible within the stated range, this merely delays the process without providing any advantage.

At the beginning of the second addition of water, during the first 1 or 2 minutes of addition, the rate of change of power drawn by the mixing equipment is used as a reference to guide the volume and the rate of addition of the remainder of the water. Subsequent additions of water must be such that the rate of change of power drawn by the equipment remains the same, or varies only by a certain percentage of the value measured at the beginning of the addition of the second amount of water. The rate of change will vary according to the type of equipment used, and the characteristics of the material being agglomerated. The rate of change may be negative, positive or zero, and the rate of change may be large or small. The rate of change is measured and noted at the beginning of the second addition of water. Thereafter, the rate of addition of water is adjusted so as to maintain the rate of change of power drawn the same as it was at the beginning of the second addition of water within a certain percentage. When the rate of change increases the rate of addition of water is decreased; when the rate of change in power drawn decreases, the rate of addition of water is increased.

With the correct rate of addition of water, the rate of change of power drawn remains constant, within about ±5% of the rate of change observed at the beginning of the addition of the second amount of water.

Subsequent additions of water may be controlled by a standard PID (Proportional Integral Derivative) feedback control loop. An example of such a device is the OMRON Model ES-100 supplied by Omron Canada Inc., of 350 Middle Road, Scarborough, Ontario, Canada, M1S 5B1. The set point for the feedback control is the reference rate of change of power drawn. The set point may be fixed throughout the second addition of water. More advantageously, it either may be increased with time, step wise or continuously, until the final set point is as much as six times the original set point, or it may be decreased with time until the final set point is as low as one half the original set point. The output of the feedback controller controls the flow of water during the second addition of water. If the measured rate of change of power drawn is above the selected set point, then the PID feedback controller will start to reduce the flow of water. Conversely, if the measured rate of change of power drawn is below the selected set point, then the PID feedback controller will increase the flow of water.

The end of the second addition of water can be one of the following: stopping the flow of water by the feedback control loop; or when a total amount of water has been added; or when a selected elapse of time from the start of the batch has taken place.

As more of the water is added, the amount of free (unreacted) water in the mixture tends to increase and this results in an increase in the viscosity. Consequently, the rate of addition of the water should be decreased as more water is added. Towards the endpoint, the required successive reductions in the rate of water addition are large, until ultimately the rate of addition of water reaches zero.

With different intensive mixers, the optimum power drawn by the ploughs will differ, but the principle remains the same that the critical rate of change of power drawn for governing the subsequent water addition is equal to that observed at the beginning of the second addition of water within the stated range. Thereafter, the rate of water addition is adjusted so that the rate of change of power drawn is maintained within the selected percentage range of the stated critical amount.

It has further been found that for any given mixture of the same composition and reactivity, and when the other parameters mentioned above are kept constant, such as temperature, efficiency of the mixing equipment, etc., the required rate of water addition will be highly reproducible from batch to batch. Consequently, once effective water addition rates have been established for a first batch, it is no longer necessary to measure and monitor the rate of change of power drawn in subsequent batches. For each new mixture and/or equipment, it may therefore be necessary to carry out one or a number of trial runs on small scale test batcher in which the rate of change of power drawn is measured in order to establish the optimal rates of water addition. Once these have been established, the rate of change of power drawn need no longer be monitored, provided all of the operating parameters remain constant from batch to batch.

Consequently, other methods of controlling the rate of water addition may be used once an effective rate has been determined; for example:

1) by a timer, which adjusts the flow rate as a function of the time elapsed since the beginning of agglomeration;

2) by monitoring the total energy input of the system, which is the sum of the power to the plough and the cutters, and stopping the addition of water once a target value is reached; or 3) by a digital computer comparing the power consumption with a target power consumption, and opening and closing a water addition valve accordingly.

The total energy consumed during the mixing and agglomeration process is believed to be a function of the following characteristics, among others:

1) the activity of the undercalcined alumina;
2) the temperature of the materials being agglomerated;
3) the temperature of the equipment;
4) the granulometry of the dust and of the undercalcined alumina;
5) the speed of rotation of the drum and the cutters;
6) the type of drum and cutters; and
7) the number and size of the cutters.

It has been found in particular that the following water addition scheme is suitable for most mixtures in most types of intensive mixers. In this scheme, the water is added according to the following steps as the intensive mixing or fluidized bed agglomeration proceeds:

(a) 40–80% of the total amount of the water is added at a rate such that it requires up to 10 minutes to complete the addition;

(b) optionally a period of time is then allowed to pass after the addition of water in step (a) before proceeding further, while intensive mixing continues;

(c) after 5 to 16 minutes from the beginning of the water addition in step (a), the remainder of the water is added at a rate not greater than 0.07 parts per minute;

(d) optionally the rate of addition in step (c) is decreased so that the addition of the remainder of the water ends at about 20 to 50 minutes, more preferably 20 to 30 minutes, from the beginning of the water addition in step (a); and (e) optionally, the mixing is continued for 2 to 3 minutes to homogenize the agglomerates by adsorbing the loose dust and strengthening the shapes by further mixing.

Before the water is added in step (a), it is usual to dry mix the binder and dust until they achieve homogeneity. This is normally carried out in the intensive mixer, although other equipment could be used, if desired. Such dry mixing normally takes about 1 to 2 minutes.

In step (d), the rate of water addition can be carried out either continuously or in a stepwise manner, as desired.

During the initial mixing process in step (a), all of the water is absorbed. The final water addition of step (c) provides the water necessary to continue rehydrating the undercalcined material, while keeping the amount of free water at the desired level and thereby avoid excess or deficient amounts which lead respectively to lumpy mixtures or pastes and dry dusty agglomerates.

The stated procedure, which is especially well suited for agglomerating dust from the thermal conversion of gibbsite to sub-alpha or alpha alumina in Eirich type and similar intensive mixers at temperatures around 55° C., ensures that the mixture becomes neither too wet nor too dry during the rehydration process so that agglomerates of a desirable size and strength are formed.

FIG. 1 of the accompanying drawings, shows a typical water addition scheme of this kind in graphic form. A first, rapid water addition indicated by reference numeral 10 takes place at time zero and is complete in under one minute. This is the principal water addition of step (a) above. The mixing is then continued without further water addition for a period of about 9 minutes and then water is added again 10 minutes after the commencement of mixing as indicated by reference numeral 11. The rate of water addition starts fairly high and is then gradually and continuously reduced as indicated by reference numeral 12. After about 32 minutes, the water addition is abruptly stopped, at the point indicated by reference numeral 13, when the entire calculated amount has been added.

The continuous reduction in the rate of addition of the water indicated by curve 12 could be replaced by a stepwise reduction following a similar trace.

While the rate and scheme of water addition is important for the reasons indicated above, it has additionally been found that the rate of formation of the product and its quality are improved when the temperature of the mixture is maintained above room temperature, and preferably as close to 100° C. as possible during the intensive mixing. Consequently, it is desirable to pre-heat the feed materials, i.e. the dust, the undercalcined alumina and the water, to a temperature between 50° and 100° C.

After their formation, the agglomerates are preferably made to undergo an aging process which involves holding the agglomerates under conditions of high relative humidity (at least 50% and preferably at least 90%) at a temperature of at least 80° C., more preferably 80°–100° C., for a period of at least one hour, and more preferably 2 hours, in a closed environment. To achieve this, it is usually sufficient merely to place the product of the mixing step directly into a sealed container or conveyor system without providing heating or humidification because the rehydration process is exothermic and the heat thus generated maintains the temperature of the agglomerates to the desired extent, and the small amount of excess water inevitably present in the agglomerates leads to the formation of a humid atmosphere in the closed system. The humidification is normally carried out at atmospheric pressure, although elevated pressure could be employed, if desired, and results in full rehydration of the alumina which provides strength and resistance to breakdown during subsequent handling.

While not wishing the invention to be limited to any particular theory, it is believed that the undercalcined alumina undergoes a form of polymerization involving hydroxyl bonds in the presence of water and bonds to or traps the ESP dust in its matrix. The final aging step helps to complete the polymerization and thus to improve the strength of the product.

Following the aging step, the agglomerates are suitable for use for a number of applications without further treatment. However, the agglomerates may be dried (e.g. at a temperature of up to 200° C.) and/or calcined (e.g. at a temperature of between 200° and 2000° C.). Calcination converts the alumina to a fully anhydrous form which may be required in certain applications, e.g. for addition to molten salt electrolysis cells. The calcination step may result in the formation of either sintered or unsintered agglomerates, depending on the calcination conditions. However, it is an advantage of the present invention that even the unsintered agglomerates have good strength and at the same time retain their ability to be processed further. For certain applications, during the calcination step, sintering should be avoided because a sintered product may not be suitable for return to a product line or for other commercial use.

While the invention has been described above as a batch operation, the process may alternatively be carried out continuously when desired. Continuous operation generally requires a longer intensive reactor than the batchwise operation, since it is necessary to provide different zones for the various mixing and holding procedures, e.g. steps (a) to (d). Suitable reactors of this kind can be obtained from Draiswerke GmbH, of Mannheim, Germany. Reactors of 3,000 and 5,000 litre capacity are available from this company.

As indicated earlier, the present invention is not limited to the treatment of dust generated during the thermal conversion of gibbsite to sub-alpha alumina using undercalcined alumina from an intermediate stage as the binder. The agglomerates can be formed with any binder containing undercalcined alumina from any source. The dust may be originate from any kind of process, e.g. crushing, grinding, screening, washing, etc., and may or may not contain alumina. Further, it is not essential that the dust and binder originate from the same industrial process.

The invention is illustrated by the following non-limiting Examples and Comparative Example. In Comparative Example 1 and Examples 1 to 3, intensive mixing was carried out in a Littleford Model FM-130D (Trademark) Intensive Mixer. This equipment comprised a 130 litre capacity drum fitted with a bank of six removable plough shaped mixing elements and an independently operated high speed chopper, along with watt meters to monitor the power drawn by both the main plough drive and the chopper drive motors. Slow additions of water were introduced through a spray nozzle (Spraying Systems VeeJet #40015 <Trademark>) mounted above the high speed chopper. The entire assembly was heated by means of a steam jacket.

The materials added to the mixer/agglomerator consisted of 42 kg ESP alumina dust and 21 kg of undercalcined alumina (Alcan AA-101 <Trademark>) ground to a median size of less than 30 microns. The solids were premixed dry in the device for one minute prior to water addition. Approximately 26 litres of water heated to 55° C. was used in all these Examples, but this amount of water was added at different times and rates as indicated. After the water addition, the agglomerates were aged in a humid atmosphere to develop further strength.

In Examples 4 and 5, mixing was carried out in an intensive mixer made by Draiswerke GmbH of Mannheim, Germany, as stated in the Examples.

COMPARATIVE EXAMPLE 1

After the indicated premixing, all of the water was added in one shot (over about 10 seconds) and the mixer was run for 15 minutes. The temperature of the mixture was 32° C. at the beginning and had risen to 90° C. at the end of 15 minutes. The product consisted mainly of unsatisfactory large, weak agglomerates.

EXAMPLE 1

After the premixing step, 16 litres of water was added in one shot and the mixer was run for 10 minutes. At this point, the temperature of the mixture was 93° C. and the power drawn by the ploughs was 1900 watts. Thereafter, the continuous addition of water was begun at a rate of 0.5 litres per minute. Fourteen minutes after the beginning of the mixing, small seed agglomerates had been produced. Twenty minutes after the beginning of the mixing, the temperature had risen to 92° C. and the power drawn by the ploughs increased notably to 5400 watts. The addition of water was stopped, but the mixing was continued at a constant power demand of 5400 to 6200 watts. A total of 9.7 litres of water had been added at the slow addition rate, for a total addition including the 16 litres added at the beginning of 25.7 litres. Twenty seven minutes after the mixing began, the contents of the mixer consisted of spherical shapes, less than 1 mm in diameter. Mixing was stopped 33 minutes after the batch was begun.

The product consisted of satisfactory agglomerates of 500 microns average diameter with 5.6% larger than 1000 microns and 4.6% smaller than 45 microns. The product was resistant to crushing and attrition.

EXAMPLE 2

After the premixing step, 16 litres of water was added in one shot. The mixing was continued for 15 minutes and, at the end of this time, the temperature of the mixture was 90° C. and the power drawn was 2800 watts. The slow addition of the minor part of the water was then started at a rate of 0.5 litres/minute. Thirty four minutes after the beginning of the mixing, when the power drawn by the ploughs increased suddenly to 4500 watts, and the temperature of the batch had increased to 93° C., the addition of water was stopped. At this point, a total of 25.5 litres of water had been added. Mixing was continued to consolidate the shapes at a power input of between 4500 and 6000 watts, until the total elapsed time from the beginning of the batch was 37 minutes.

The product consisted of satisfactory agglomerates of 250 microns in average diameter; 3.6% being larger than 1000 microns and 7.0% being less than 45 microns. The index of attrition of the product was 4.8.

EXAMPLE 3

After the premixing, 16 litres of water was added in one shot. The mixing was continued for 8 minutes, at which time the temperature of the mixture was 95° C. and the power drawn was 3500 watts. A slow addition of water was started at a rate of 0.5 litres/minute, and the power drawn continued at 3600 to 4200 watts. Twenty seven minutes after the commencement of mixing, the temperature of the mixture had increased to 94° C. and the power drawn suddenly increased to 5200 watts, whereupon the addition of water was stopped. At this point, an additional 9.2 litres of water had been added for a total of 25.2 litres. Mixing was continued for another three minutes at a power drawn of 5800 watts. The process was stopped 30 minutes after the beginning.

The product consisted of satisfactory agglomerates having an average diameter of 500 microns with 4.6% larger than 1000 microns and 5.0% less than 45 microns. The index of attrition was 7.4.

EXAMPLE 4

This example was carried with a Drais Model T 160 (Trademark) intensive mixer. This equipment comprised a 130 litre capacity drum fitted with a bank of six removable plough shaped mixing elements and an independently operated high speed chopper, along with a watt meter to monitor the total power drawn by the equipment. Slow additions of water were introduced through a spray nozzle mounted above the high speed chopper. The entire assembly was heated by an oil jacket. The characteristic of this equipment was that the rate of change of power drawn was very small, but increased suddenly at the end point.

The material added to the mixer agglomerator consisted of 52 kg of ESP alumina dust and 26 kg of undercalcined alumina (Alcan AA-101) ground to a median size of less than 30 microns. The solids were premixed in the device for one minute prior to the water addition.

After the premixing, 21.6 kg of water heated to 55° C. was added in one shot. The mixing was continued for 11.5 minutes, at the end of this time the temperature of the mixture was 96° C. and the power drawn was 13300 watts. Thereafter the continuous addition of water was begun at a rate of 0.550 L/min. The power drawn decreased slightly but steadily with time, being 13250 watts at 20 minutes, at which time the temperature of the mixture was 96.6° C.; 13000 watts at 25 minutes at which time the temperature was 96.7° C.; and 12650 at 30 minutes at which time the temperature had reached 97.0° C. Thereafter the rate of addition of the water had to be steadily decreased in order to keep constant the rate of change of power, with the result that at 33.5 minutes, the water addition had been stopped completely to keep the rate of change constant, at which time the actual power drawn was 12100 watts. At this point the temperature had reached 97.7° C. The amount of water added during the second addition was 10.87 kg.

EXAMPLE 5

This work was also done with the Drais Model T 160 (Trademark) intensive mixer. The material added to the mixer agglomerator consisted of 52 kg of ESP alumina dust and 26 kg of undercalcined alumina (Alcan AA-101) ground to a median size of less than 30 microns. The solids were premixed in the device for one minute prior to the water addition.

After the premixing, 21.6 kg of water heated to 55° C. was added in one shot. The mixing was continued for 6.0 minutes, at the end of this time the temperature of the mixture was 96° C. and the power drawn was 13300 watts. Thereafter the continuous addition of water was begun at a rate of 0.550 L/min. The power drawn decreased slightly but steadily with time, being 13500 watts at 11 minutes after the mixing was started, and at this time the temperature of the mixture was 99.1° C.; 13000 watts at 20 minutes after mixing had started at which time the temperature was 99.0° C.; and 12500 at 30 minutes after the mixing had started at which time the temperature had reached 98.7° C. Thereafter the rate of addition of the water had to be steadily decreased in order to keep constant the rate of change of power, with the result that at 31.5 minutes, the water addition had been stopped completely to keep the rate of change constant, at which time the actual power drawn was 12100 watts. At this point the temperature had reached 97.7° C. The amount of water added during the second addition was 13.2 kg.

What we claim is:

1. A process for producing agglomerates from dust created by an industrial process, comprising:

grinding particles of a binder containing undercalcined alumina to a median particle size of less than 30 microns and to a specific surface area in the range of 90–300 m²/g;

combining about 1–4 parts by weight of said dust with one part by weight of said ground binder to form combined solids;

mixing the combined solids with water to produce agglomerates, the total amount of added water being about 0.8–1.2 parts by weight for every part by weight of said ground binder, plus about 0.08 to 0.12 parts by weight for every part by weight of said dust; and optionally aging the resulting agglomerates in a closed environment at a temperature of at least 80° C. for at least one hour in at least 50% humidity;

wherein the water is mixed with said combined solids by intensive mixing in a mixer equipped with a mixing motor; and wherein said water is added to said combined solids according to the following scheme:

(a) 40–80% of said total amount of water is added to said combined solids at a rate such that no more than 10 minutes are required for complete addition, forming a mixture having a viscosity;

(b) optionally allowing a period of time to pass after the addition of the water in step (a) before proceeding further while continuing said intensive mixing;

(c) commencing an addition of a remainder of said water and measuring a characteristic of said mixture corresponding to said viscosity and using the measurement as a reference value; and (d) continuing the addition of said remainder of said water while continuing to measure the said characteristic of the mixture, said water being added at such a rate that said characteristic of the mixture remains the same as said reference during the addition or varies by less than ±5% of said reference value.

2. A process according to claim 1 wherein said characteristic of said mixture corresponding to said viscosity is a rate of change of power required by said motor to mix said mixture.

3. A process according to claim 2 wherein said characteristic of said mixture corresponding to said viscosity is a rate of change of power required by said motor to operate ploughs mixing said mixture.

4. A process according to claim 1 further comprising drying and calcining said agglomerates without sintering.

5. A process according to claim 1 further comprising drying and calcining said agglomerates with sintering.

6. A process according to claim 1 wherein said binder comprises undercalcined alumina taken from an intermediate stage in a process for thermal conversion of gibbsite to sub-alpha or alpha alumina.

7. A process according to claim 6 wherein said dust is a dust created by a process of thermal conversion of gibbsite to sub-alpha or alpha alumina.

8. A process according to claim 7 wherein said dust is electrostatic precipitator dust.

9. A process according to claim 1 wherein said solids mixture has a loss on ignition in the range of 1–35% by weight before addition of said water.

10. A process according to claim 1 wherein said agglomerates have a size in the range of 0.05 to 2 mm.

11. A process for producing agglomerates from dust created during an industrial process by a series of batchwise operations, comprising carrying out the process of claim 1 on at least one batch and recording the rate of water addition in step (d) required to maintain said reference value within said percentage range, then producing agglomerates from further batches by maintaining all conditions the same as in said at least one batch, but without measuring said characteristic corresponding to viscosity in steps (c) and (d), while employing said recorded rate of water addition required for step (d).

12. A process according to claim 11 wherein said at least one batch is a small scale test quantity.

13. A process for producing agglomerates from dust collected during the thermal conversion of a material containing predominantly gibbsite to sub-alpha alumina by a multistage thermal process having at least one intermediate stage, which process comprises:

removing undercalcined alumina from an intermediate stage of said thermal conversion;

grinding particles of said undercalcined alumina to a median particle size of less than 30 microns and to a specific surface area in the range of 90–300 m²/g;

combining about 1–4 parts by weight of the dust with one part by weight of said ground undercalcined alumina to form combined solids, the total amount of added water being about 0.8–1.2 parts by weight for every part by weight of said ground undercalcined alumina plus about 0.08 to 0.12 parts by weight for every part by weight of said dust;

mixing the combined solids with water to produce agglomerates; and optionally aging the resulting agglomerates in a closed environment at a temperature of at least 80° C. for at least one hour in at least 50% humidity;

wherein the water is mixed with said combined solids by intensive mixing; and wherein the water is added according to the following scheme:
(a) 40–80% of the total amount of the water is added at a rate such that it requires up to 10 minutes to complete the addition;
(b) optionally a period of time is then allowed to pass after the addition of water in step (a) before proceeding further, while intensive mixing continues;
(c) after 5 to 16 minutes from the beginning of the water addition in step (a), the remainder of the water is added at a rate not greater than 0.07 parts per minute; and
(d) optionally the rate of addition in step (c) is decreased so that the addition of the remainder of the water ends at about 20 to 50 minutes from the beginning of the water addition in step (a).

14. A process according to claim 13 wherein said mixture has a temperature between room temperature and 100° C. as said water is added.

15. A process according to claim 14 wherein said binder, said dust and said water are preheated to a temperature in the range of 50° to 100° C. prior to adding said water to said mixture.

16. A process according to claim 13 wherein said agglomerates are aged at a temperature of 80° to 110° C. for at least one hour in at least 50% humidity.

17. A process according to claim 13 wherein said agglomerates are aged in an atmosphere of at least 90% relative humidity.

18. A process according to claim 13 wherein said dust is electrostatic precipitator dust.

19. A process according to claim 13 wherein said binder has a median particle size in the range of about 55–120 microns before said grinding is carried out.

20. A process according to claim 13 wherein the resulting agglomerates have a median size in the range of 0.05 to 2 mm.

21. A process according to claim 13 which further comprises drying said agglomerates at a temperature up to 200° C. following said aging.

22. A process according to claim 13 which further comprises calcining said agglomerates following said aging at a temperature between 200° and 2000° C.

23. A process according to claim 13 wherein said undercalcined alumina is a material collected from a secondary cyclone of an alumina calciner or precalciner employed for said thermal process.

24. A process according to claim 13 wherein said intensive mixing is carried out to produce generally spherical agglomerates having a median size in the range of 0.05–2 mm.

* * * * *